Patented June 14, 1949

2,473,145

UNITED STATES PATENT OFFICE 2,473,145

PREPARATION OF WATER-SOLUBLE THERMOSETTING RESINS

Robert C. Hesselbart, Toledo, Ohio, assignor, by mesne assignments, to Libbey-Owens-Ford Glass Company, a corporation of Ohio No Drawing. Application October 15, 1942, Serial No. 462,119

6 Claims. (Cl. 260—57)

The invention relates to the preparation of water-soluble thermosetting resins, and particularly to the preparation of a highly water-soluble, fusible thermosetting phenol-formaldehyde resin capable of serving as an air-drying tack-free adhesive.

For most applications, particularly in the manufacture of plywood, it is desirable to spread an adhesive in a very thin film. If an adhesive cannot be diluted with water, it cannot be thinned so as to permit it to be spread in any desired film weight, since the use of a non-aqueous solvent as a thinner would entail a prohibitive expense. When a phenol-formaldehyde resin adhesive containing no thinner is used for the production of plywood, it produces a resin spread that for most purposes is unnecessaryily heavy, and plywood thus produced is too expensive for most applications.

To be acceptable for all commercial uses, a phenol-formaldehyde resin adhesive should not only be soluble in water, but should also be solid and non-tacky at ordinary temperatures, i. e., the adhesive when spread on a piece to be glued and then dried by exposure to the atmosphere should leave a non-tacky film. If the adhesive leaves a tacky film after being air-dried, the piece cannot be handled conveniently without disturbing the film, because the tacky nature of the adhesive makes it adhere to the hands of the operators and to everything else with which the piece comes in contact.

In order to be air-drying and tack-free, a phenol-formaldehyde resin in an aqueous adhesive solution must have a softening point above ordinary temperatures so that when the adhesive solution is dried by exposure to the atmosphere, the evaporation of the water leaves a solid rather than a tacky resin. The resin should, of course, be fusible and thermosetting so that when a layer of the resin is pressed at an elevated temperature between pieces to be glued, the resin fuses to form an adhesive bond between the pieces and then hardens or sets to an infusible, insoluble product.

Although a phenol-formaldehyde resin adhesive that is water-soluble and capable of air-drying to a tack-free film is the only type of phenol-formaldehyde resin adhesive that is acceptable for all ordinary commercial uses, it is very difficult to prepare a phenol-formaldehyde resin adhesive that is both water-soluble and capable of air-drying to a tack-free film. Many phenol-formaldehyde resin adhesives that are water-soluble are not air-drying or tack-free, and many phenol-formaldehyde resin adhesives that are air-drying and tack-free are not water-soluble.

Moderately water-soluble phenol-formaldehyde resin adhesives are known, but none of the phenol-formaldehyde resin adhesives heretofore known have been sufficiently water-soluble for most requirements. Because of the limited water-solubility of all of the phenol-formaldehyde resin adhesives heretofore known, it has not been possible to use such adhesives in highly extended form, i.e., in the form of a highly dilute aqueous solution containing a relatively high proportion of an extender, such as wheat flour or rye flour.

Phenol-formaldehyde resin adhesives are substantially more water-resistant than urea-formaldehyde resin adhesives and would therefore be better for the manufacture of plywood and most other applications if it were not for their limited solubility in water. Because the phenol-formaldehyde resin adhesives heretofore known cannot be used in highly extended form, the use of phenol-formaldehyde resin adhesives for the ordinary types of plywood that are produced in largest volume would entail a prohibitive adhesive cost per square foot. The lack of a phenol-formaldehyde resin adhesive that can be highly extended has made it necessary for plywood manufacturers to produce a large bulk of their product with urea-formaldehyde resin adhesives, which are much less water-resistant than phenol-formaldehyde resin adhesive, but which can be highly extended so as to make it possible to use them for ordinary inexpensive types of plywood.

The principal object of the invention is the preparation of a novel, highly water-soluble, fusible thermosetting resin that is capable of air-drying to a tack-free film, and also is capable of being highly extended. More specific objects and advantages are apparent from the description, which discloses and illustrates the invention, and is not intended to impose limitations upon the claims.

In accordance with the invention a highly water-soluble, fusible thermosetting resin capable of serving as an air-drying tack-free adhesive is prepared by condensing formaldehyde and phenol under acid conditions in a molar ratio substantially below 1.0:1 but not less than about ½:1 until the exothermic reaction has progressed to a substantial degree, adding alkali equivalent to an amount of sodium hydroxide not less than about 6 per cent of the weight of phenol used, and reacting with additional formaldehyde to bring the molar formaldehyde-phenol ratio to a value from 1:1 to about 2½:1.

The formaldehyde and phenol may be brought together in any desired manner in order to cause the condensation to take place. The formaldehyde used may be in the form of a polymer, such as paraformaldehyde. The ordinary commercial form of formaldehyde, however, is a 37 per cent aqueous solution, and the condensation may be carried out satisfactorily in the presence of the water contained in such a solution and any water that is contained in the phenol used. If a small batch is being prepared, a reflux condenser may be employed to prevent the loss of indeterminate amounts of water and to maintain a uniform concentration so as to facilitate control of the reaction conditions. If the batch is large, however, the loss of water is not appreciable and it is not necessary to employ a reflux condenser if the reaction vessel is kept covered.

In the initial condensation, the molar formaldehyde-phenol ratio should be substantially below 1.0:1, for example 0.9:1 or preferably about 0.8:1 or less. If the initial molar formaldehyde-phenol ratio is not substantially below 7.0:1, the product is not sufficiently water-soluble and is too viscous. If the initial molar formaldehyde-phenol ratio is less than about ½:1, the product produces an adhesive film that after being air-dried is not track-free at ordinary temperatures.

The initial condensation between the formaldehyde and phenol is carried out under acid conditions and the speed of the condensation is determined by the acidity. The acidity employed may be varied widely: for example, it may be found desirable under various conditions to use an acidity as low as that corresponding to ½ part by weight of concentrated sulfuric acid per 100 parts of phenol, or an acidity as high as that corresponding to 2 parts by weight of concentrated sulfuric acid per 100 parts of phenol. Of course, in any case the acidity should be great enough to cause condensation of the formaldehyde and phenol to take place. The degree of acidity employed is simply that which causes condensation to take place at the desired speed.

Since it is acidity rather than any specific catalyst that is required, any desired acid of reasonable strength may be used. Strong acids, such as sulfuric, hydrochloric, and phosphoric acids, are preferred because it is necessary to add them only in small quantities.

The initial condensation reaction should be continued until the exothermic reaction has progressed to a substantial degree. During this stage the solution separates into two phases. The time required for the reaction varies with the temperature. For example, a solution that separates into two phases in one-half hour at 60° C. takes about one hour to separate into two phases at 50° C. If in this stage of the process the exothermic reaction is not allowed to progress to a substantial degree, the softening point of the final product is not above ordinary temperatures so that the filmed adhesive is not tack-free. It is usually preferable to carry the exothermic reaction to completion. The exothermic reaction may be considered substantially complete when it becomes necessary to heat the solution in order to keep it at a temperature of about 90° C. If a relatively high molar formaldehyde-phenol ratio, such as 0.8:1 or more, is used, the initial condensation is more difficult to control and the reaction should not be allowed to go as far as in other cases.

The temperature at which this initial condensation reaction is carried out is simply a temperature which causes the reaction to take place at the desired speed. If the solution is brought to an elevated temperature at the beginning of the initial condensation reaction, it may be necessary to provide means for cooling the mass in order to keep the reaction from getting out of control. After the reaction has proceeded for a short time, it is less violent so that the temperature may be increased somewhat without increasing the difficulty of controlling the reaction. Thus, the temperature at which the reaction is most conveniently carried out depends upon the size of the batch, the presence or absence of means for cooling the batch, the efficiency of the particular cooling means employed, and other factors that enter into the control of the reaction. Under some conditions the reaction may be carried out at room temperature although the reaction takes much longer at room temperature than at an elevated temperature. The water present need not be removed.

The next stage of the process begins with the addition of alkali equivalent to an amount of sodium hydroxide not less than about 6 per cent of the weight of phenol used. At least this quantity of alkali is required to cause the two phases to dissolve in one another and form a single phase. The addition of this quantity of alkali converts the product substantially into a single phase, but it may be desirable to use as much as 7 per cent in some cases to cause the two phases to dissolve completely in one another. The amount of alkali used may be increased above 6 per cent to 11 per cent or more, or to any reasonable value. Of course, a large excess of alkali is undesirable because it represents a waste of alkali and may cause an unwanted reduction in the viscosity of the adhesive and an undesirable increase in the speed of hardening of the adhesive.

At this stage of the process it is not necessary to employ any particular alkali, but only an alkali such as sodium hydroxide, potassium hydroxide, lithium hydroxide, sodium carbonate or the like, which is strong enough to produce alkalinity equivalent to that which would be produced by the addition of an amount of sodium hydroxide not less than about 6 per cent of the weight of phenol used.

After the addition of the alkali, the condensation product is reacted with additional formaldehyde to bring the molar formaldehyde-phenol ratio to a value from about 1:1 to about 2½:1.

Preferably the condensation mass should be stirred or allowed to stand until it is in the form of a substantially homogeneous solution before the additional formaldehyde is introduced. The alkali when added to the condensation mass, which is in two phases, dissolves first in the aqueous layer. If the additional formaldehyde is introduced while the alkali is still substantially confined to the aqueous layer, a quick reaction between the non-aqueous layer and the added formaldehyde may take place with the production of an insoluble product. The added formaldehyde may be in the form of a solid polymer or in any other desired form, but it is most convenient to add the formaldehyde in the form of an ordinary commercial aqueous solution.

The formaldehyde may be added to the solution without heating, because the added formaldehyde reacts with the condensation product at ordinary temperatures. If the solution is not to be used immediately as an adhesive, it may be allowed to stand while the added formaldehyde reacts. Usually it is desirable to heat the solution in order to obtain the final product in a short time. The reaction of the added formaldehyde with the condensation product may be considered to be substantially complete when the odor of formaldehyde has disappeared.

If the formaldehyde-phenol ratio of the final product is below 1:1, the product is substantially non-thermosetting. The amount of formaldehyde added should be sufficient to bring the molar formaldehyde-phenol ratio to a value from about 1:1 to about 2½:1, preferably to a ratio of about 1½:1. About 2½ mols of formaldehyde is the maximum that will react with each mol of phenol in this stage of the process. An excess of formaldehyde above 2½ mols for each mol of phenol may be added if desired, but such excess remains unreacted in the product, imparts a permanent odor of formaldehyde to the adhesive and may produce other undesirable properties.

Since the adhesive is air-drying and tack-free, a solution so prepared may be evaporated by any suitable method such as spray-drying or vacuum drum-drying to produce a solid resin which is more convenient for storage or shipment than a solution. An adhesive of any desired consistency may be prepared by adding the proper proportion of water to the solid resin so obtained.

An adhesive prepared in accordance with the present invention is highly soluble in water so that dilute aqueous solutions can be prepared. Any desired proportions of an extender, such as wood flour, rye flour, walnut shell flour or soy bean flour, may be added to the adhesive to give it reasonably high viscosity and tackiness when diluted with a relatively large proportion of water. A highly extended adhesive so prepared can be applied in the manufacture of plywood to give a weight of resin per square foot much less than the minimum weight of resin per square foot that it has been possible to employ in the application of the phenol-formaldehyde resin adhesives heretofore known. Thus, the present adhesive can be employed in the manufacture of ordinary inexpensive plywood at a cost as low or lower than that which would result from the use of a urea-formaldehyde resin adhesive. Plywood manufactured with the present adhesive is much more water-resistant and is therefore better for most purposes than plywood in which the same amount per square foot of a resin made from urea and formaldehyde is used as the adhesive.

An important advantage of the present adhesive over a urea-formaldehyde resin adhesive is that the present adhesive is much more stable. The present adhesive, containing an alkali which serves as a catalyst to cause the conversion of the resin to the infusible state during hot-pressing, is as stable as a solution of a urea-formaldehyde resin adhesive containing no catalyst. The latter solution is less convenient to use because it is necessary to add a catalyst to the solution just before it is applied, and then to use up the urea-formaldehyde resin adhesive solution containing the catalyst before the catalyst has caused the urea-formaldehyde product to be converted into an infusible, insoluble resin. Even after a urea-formaldehyde resin adhesive solution has been applied to wooden plies or other pieces to be glued and allowed to dry, it is necessary to use considerable haste in assembling the pieces and in carrying out the hot-pressing, because the catalyst causes the urea-formaldehyde product to harden rapidly to an infusible resin even after the solution has been applied and dried. The present resin adhesive is much more stable than a urea-formaldehyde resin adhesive solution containing a catalyst and the present adhesive can be used commercially by more economical and orderly methods since pieces coated with the present adhesive can be allowed to stand indefinitely without spoilage of the adhesive.

Of course, the operator may add alkali to the present adhesive just before it is applied in order to increase the amount of catalyst present and thus accelerate the curing of the adhesive during the hot-pressing operation, although it is not necessary to do so.

*Example 1*

A condensation reaction is carried out by rapidly stirring 1460 grams of a 37 per cent aqueous solution of formaldehyde, 2400 grams of 94 per cent phenol (molar ratio 0.75:1) and 120 grams of a 20 per cent aqueous solution of sulfuric acid for 70 minutes with cooling while keeping the temperature at 60° C., and then maintaining the mass at 90° C. with rapid stirring for 60 minutes. The solution separates into two phases after about 30 minutes at 60° C. The evolution of heat gradually decreases so that it is necessary to supply heat for the last 30 minutes in order to maintain the mass at 90° C. Next, after the addition of 1080 grams of a 20 per cent aqueous solution of sodium hydroxide, the mass is stirred or allowed to stand until a homogeneous solution has formed. Then the molar formaldehyde-phenol ratio is raised to 1.5:1 by the addition of 1460 grams of a 37 per cent aqueous solution of formaldehyde. The solution is then heated to 75° C., held at that temperature for 60 minutes, and then cooled to room temperature. The odor of formaldehyde disappears after about 45 minutes at 75° C. The purpose of cooling at the end of the 60 minutes is to give a rigid control of the conditions of treatment to which the solution is subjected. If desired, the concentration of the solution may be adjusted by dilution or vacuum evaporation, and the solution may be evaporated in a spray-drier or vacuum drum-drier to produce a solid resin. When heated to about 140° C., the resin so prepared is transformed into an infusible, insoluble product in 60 to 80 seconds. Yet a solution prepared in accordance with the foregoing procedure is stable for about 4 days at 120° F., and for much longer periods at ordinary temperatures. At 25° C. the solution can be diluted with water to a concentration of 7 per cent solids and with acetone to a concentration of 11 per cent solids, and is completely miscible with ordinary denatured alcohol. When spread on wood, the solution air-dries to a tack-free film in 45 to 60 minutes at room temperature. After standing for 24 hours at room temperature, the resulting film is still fusible at 100° C. A substantial proportion of an extender, for example an amount of walnut shell flour equal to 20 to 45 per cent of the weight of resin or an amount of wheat flour equal to 50 to 100 per cent or more of the weight of resin, may be incorporated in the solution, together with a sufficient quantity of water to give the desired consistency. The resulting extended adhesive is a very smooth mix with no precipitation and agglomeration of the resin. Such use of extenders makes it much less expensive to manufacture plywood and other glued products by means of the adhesive.

Though the extender decreases the water-resistance of the adhesive bond, nevertheless, the water-resistance of the adhesive is so excellent that plywood prepared from a solution of the adhesive containing an amount of wheat flour equal to 50 per cent of the weight of the phenol-formaldehyde resin resists at least 2 hours' exposure to boiling water in contrast to plywood made from a urea-formaldehyde resin adhesive containing no extender, which fails after 20 minutes' exposure to boiling water. The present adhesive is so stable that plies coated therewith may be allowed to stand for a month or more before they are consolidated under heat and pressure, whereas a urea-formaldehyde resin adhesive becomes worthless after plies coated with the adhesive have been allowed to stand for less than a week. After pieces coated with an adhesive prepared in accordance with the foregoing procedure have been assembled, they may be held together for 10 minutes or more at 250° F. or for 4 minutes or more at 285° F. to cause the adhesive to become converted to an infusible, insoluble bond.

*Example 2*

A condensation reaction is carried out by rapidly stirring 1210 grams of a 37 per cent aqueous solution of formaldehyde, 2000 grams of 94 per cent phenol (molar ratio 0.75:1) and 100 grams of a 20 percent aqueous solution of sulfuric acid for 60 minutes with cooling while keeping the temperature at 60° C., and then maintaining the mass at 90° C. with rapid stirring for 60 minutes. Next, after the addition of 900 grams of a 20 per cent aqueous solution of sodium hydroxide, the mass is stirred or allowed to stand until the two phases have merged into a single phase. Then the molar formaldehyde-phenol ratio is raised to 1.5:1 by the addition of 1210 grams of a 37 per cent aqueous solution of formaldehyde. The solution is then heated to 75° C., held at that temperature for 60 minutes, and then cooled to room temperature. The resulting solution has the same concentration (about 55 per cent solids) and the same properties as a solution prepared in accordance with example 1, and may be treated in the same manner. The solution gels in about 70 seconds at 138° C. When spread in a film and air-dried, the solution leaves a non-tacky film which, however, is fused at 100° C. At 25° C. it can be diluted with water to a concentration of 9 per cent solids without precipitation. The solution remains stable up to 5 days at 120° F. If a solution is prepared by a procedure that is the same as the foregoing except that the amount of 20 per cent aqueous sodium hydroxide solution used is 700 grams instead of 900 grams, the adhesive solution obtained is similar except that it has a slightly greater viscosity, takes about 90 seconds to gel at 138° C., and can be diluted only to a concentration of 15 per cent solids at 25° C. without precipitation. If a solution is prepared by a procedure that is the same except that the amount of 20 per cent aqueous sodium hydroxide solution used is 1000 or 1100 grams instead of 900 grams, the adhesive solution obtained is similar except that it has a somewhat lesser viscosity, takes slightly less time to gel at 138° C., and can be diluted to a concentration of about 4 per cent solids at 25° C. without precipitation. If the procedure, including the addition of 900 grams of a 20 per cent aqueous sodium hydroxide solution, is carried out without change except that the final addition of 37 per cent aqueous formaldehyde solution is only 400 grams (reducing the final formaldehyde-phenol ratio to 1:1), the adhesive solution obtained is similar except that it has a somewhat lesser viscosity, takes about 110 seconds to gel at 138° C., can be diluted only to a concentration of 17½ per cent solids at 25° C. without precipitation, and remains stable up to 16 days at 120° F. If the procedure is carried out without change except that the final addition of 37 per cent aqueous formaldehyde solution is 2020 grams (increasing the final formaldehyde-phenol ratio to 2:1), the adhesive solution obtained is similar except that is has a somewhat lesser viscosity, takes about 60 seconds to gel at 138° C., can be diluted to a concentration of 1½ per cent solids at 25° C. without precipitation, and remains stable up to 3 days at 120° F. If the procedure, including the addition of 900 grams of a 20 per cent aqueous sodium hydroxide solution and the addition of 1210 grams of 37 per cent aqueous formaldehyde solution, is carried out without change except that after this final addition of formaldehyde solution, the product is held at 75° C. for 2 hours instead of 1 hour, the adhesive solution obtained is similar except that it has a considerably greater viscosity, takes about 60 seconds to gel at 138° C., can be diluted to a concentration of 5½ per cent solids at 25° C. and remains stable up to 4 days at 120° F. Of course, the heating in this final stage should not be prolonged to such an extent that the resin becomes too viscous or too infusible.

Various embodiments of the invention may be devised to meet various requirements.

Having described the invention, I claim:

1. A method of preparing a fusible thermosetting resin of greatly improved water-solubility which is capable of serving as an air-drying, tack-free adhesive that comprises condensing formaldehyde and phenol in an acid aqueous solution in a molar ratio from ½:1 to 0.9:1 until the condensation product has formed a phase separate from the aqueous phase, adding a small proportion of alkali sufficient to convert the composition substantially into a single phase, and after conversion of the composition substantially into a single phase carrying on a reaction in the alkaline solution, with additional formaldehyde sufficient to bring the molar formaldehyde-phenol ratio to a value from 1:1 to 2½:1, and continuing such reaction until a resin is produced that is a solid when dry at room temperature.

2. A method of preparing a fusible thermosetting resin of greatly improved water-solubility which is capable of serving as an air-drying, tack-free adhesive that comprises condensing formaldehyde and phenol in an acid aqueous solution in a molar ratio from ½:1 to 0.9:1 until the condensation product has formed a phase separate from the aqueous phase, adding a small proportion of alkali sufficient to convert the composition substantially into a single phase, and after conversion of the composition substantially into a single phase carrying on a reaction in the alkaline solution, with additional formaldehyde sufficient to bring the molar formaldehyde-phenol ratio to about 1½:1, and continuing such reaction until a resin is produced that is a solid when dry at room temperature.

3. A method of preparing a dry, tack-free fusible thermosetting resin of greatly improved water-solubility which is useful as an adhesive that comprises condensing formaldehyde and phenol in an acid aqueous solution in a molar ratio from ½:1 to 0.9:1 until the condensation product has formed a phase separate from the aqueous phase, adding a small proportion of alkali sufficient to convert the composition substantially into a single phase, and after conversion of the composition substantially into a single phase carrying on a reaction in the alkaline solution, with additional formaldehyde sufficient to bring the molar formaldehyde-phenol ratio to a value from 1:1 to 2½:1, continuing such reaction until a resin is produced that is a solid when dry at room temperature, and drying.

4. A fusible thermosetting resin of greatly improved water-solubility which is capable of serving as an air-drying, tack-free adhesive, prepared in accordance with the method of claim 1.

5. A dry, tack-free fusible thermosetting resin of greatly improved water-solubility which is capable of serving as an air-drying, tack-free adhesive, prepared in accordance with the method of claim 3.

6. An air-drying, tack-free aqueous adhesive comprising a wheat flour extender and a fusible thermosetting resin of greatly improved water-solubility prepared in accordance with the method of claim 1.

ROBERT C. HESSELBART.

REFERENCES CITED

The following references are of record in the file of this patent:

UNITED STATES PATENTS

| Number | Name | Date |
|---|---|---|
| Re. 19,710 | Pollak et al. | Sept. 17, 1935 |
| 1,085,100 | Baekeland | Jan. 27, 1914 |
| 1,414,139 | Kulas et al. | Apr. 25, 1922 |
| 2,150,698 | Nevin | Mar. 14, 1939 |
| 2,190,672 | Meharg | Feb. 20, 1940 |
| 2,360,376 | Van Epps | Oct. 17, 1944 |
| 2,400,718 | Siegel | May 21, 1946 |

OTHER REFERENCES

Scheiber and Sandig, Artificial Resins, pub. Pitman and Sons, London Eng. 1931, pages 146, 276–7.

Baekeland, Jour. Ind. Eng. Chem. Mar. 1909, page 151.